United States Patent [19]

Rudolph

[11] Patent Number: 4,684,488

[45] Date of Patent: Aug. 4, 1987

[54] METHOD AND APPARATUS FOR CONTROLLED SUPPLY OF COLOR CONCENTRATES INTO AN EXTRUDER TO OBTAIN A PLASTIC PRODUCT OF DESIRED COLORATION

[75] Inventor: Joachim Rudolph, Weil der Stadt, Fed. Rep. of Germany

[73] Assignee: Werner & Pfleiderer, Fed. Rep. of Germany

[21] Appl. No.: 825,232

[22] Filed: Feb. 3, 1986

[30] Foreign Application Priority Data

Feb. 14, 1985 [DE] Fed. Rep. of Germany ....... 3505036

[51] Int. Cl.[4] ............................................. B29G 47/92
[52] U.S. Cl. .................................. 264/40.2; 264/40.4; 264/40.7; 264/211.23; 425/135; 425/145; 425/169; 425/204
[58] Field of Search ...................... 264/40.2, 40.4, 40.7, 264/245, 211, 40.1, 211.23; 425/135, 145, 131.1, 169, 204

[56] References Cited

U.S. PATENT DOCUMENTS

| | | | |
|---|---|---|---|
| 2,540,146 | 2/1951 | Stober | 264/40.2 |
| 3,352,952 | 11/1967 | Marr | 425/131.1 |
| 3,583,680 | 6/1971 | Aust et al. | 425/131.1 |
| 4,101,613 | 7/1978 | Norwood | 264/40.4 |
| 4,107,245 | 8/1978 | Jansson | 264/78 |
| 4,604,251 | 8/1986 | Kuhman | 264/40.2 |

FOREIGN PATENT DOCUMENTS

| | | | |
|---|---|---|---|
| 2838110 | 3/1980 | Fed. Rep. of Germany ... | 425/131.1 |
| 53-40062 | 4/1978 | Japan | 264/40.2 |
| 54-23662 | 2/1979 | Japan | 264/40.2 |
| 58-81126 | 5/1983 | Japan | 264/40.2 |
| 59-76225 | 5/1984 | Japan | 264/40.1 |
| 1095015 | 12/1967 | United Kingdom . | |

Primary Examiner—Jeffery Thurlow
Attorney, Agent, or Firm—Roberts, Spiecens & Cohen

[57] ABSTRACT

A method and apparatus for regulating the drive of dosaging devices for the controlled feeding of plastic particles, color concentrates and additives into a supply hopper of a screw extruder for producing a mixed plastic product of determined coloration, comprising periodically measuring the coloration of the mixed product at an outlet of the extruder by a spectrometer connected to a measurement probe, comparing the measured coloration of the mixed product with the coloration of the desired product, and adjusting the supply of the plastic product, concentrates and additives, as necessary, so that the measured coloration of the product at the outlet of the extruder is the same as the coloration of the desired product.

7 Claims, 2 Drawing Figures

METHOD AND APPARATUS FOR CONTROLLED SUPPLY OF COLOR CONCENTRATES INTO AN EXTRUDER TO OBTAIN A PLASTIC PRODUCT OF DESIRED COLORATION

FIELD OF THE INVENTION

The present invention relates to a method and apparatus for the controlled supply of color concentrates into a screw extruder to obtain a plastic product of desired composition based on its coloration.

PRIOR ART

Federal Republic of Germany AS No. 12 85 167 discloses the controlled introduction of additives into a polymerization molten mainstream of the polymerization product by an adjustable feed or dosaging device controlled by a preselector device and/or a level measuring device in proportion to the product in the mainstream.

The known method and apparatus seeks to adapt the concentration and quantity ratio of the components as a whole to a resultant quantity. However, the resultant quantity varies with respect to time during the production process. Since the signals for controlling the supply of the additives are derived from one of the components fed, namely from the product mainstream, such a method is not suitable for the accurate feeding of components in very small quantities.

In order to satisfy the color standard in the preparation and extrusion of colored plastics, expensive measures were heretofore necessary. The main plastic components and the addition components are fed separately into the supply hopper of a screw extruder, for instance, by belt scales and the components are mixed and extruded in the extruder.

In order to detect color deviations in the plastic product a closable cutout was formed in the extruder for separate discharge of a sample and the composition of the supplied components was altered on the basis of any detected color variation. The process was repeated several times until the extruded product satisfied the desired color standard.

SUMMARY OF THE INVENTION

An object of the invention is to provide a method in which deviations in the color intensity of the extruded product of a mixture can be reliably counteracted.

In accordance with the invention, a method is provided which comprises periodically measuring the coloration of the mixed product at an outlet of the extruder by a spectrometer connected to a measurement probe, comparing the measured coloration of the mixed product with the coloration of the desired product of determined composition, and adjusting the supply of the concentrates and additives, as necessary so that the measured coloration of the product at the outlet of the extruder is the same as the coloration of the desired product and thereby the composition of the product will be in correspondence with the desired composition.

Heretofore, even with the same color concentrate and/or pigment and despite an established and accurately maintained composition, the shade or coloration of each new production batch differed. However in accordance with the method of the invention by using the spectrometer with periodic color comparison, continuous monitoring and correction of the composition of the mixture to be extruded is obtained.

In this connection, even slight deviations of color in the extruded product can be determined and used to regulate the supply or dosaging means so that even very small changes in quantity in the added coloring substances are continuously made possible. The production of a change in composition is eliminated.

A further object of the invention is to provide apparatus which will monitor the coloration of the mixed product and adjust the constituents of the incoming composition to correct any deviations from the desired, pre-determined sample.

In accordance with the invention, there is provided apparatus for producing an extruded plastic product of determined composition and coloration comprising a screw extruder including a housing having an inlet and an outlet, a hopper at said inlet, first means for introducing solid, plastic particles into said hopper, second means for introducing color concentrates into said hopper and third means for introducing additives into said hopper, regulating means connected to each of said first, second and third means for regulating the output therefrom into the hopper, control means connected to said regulating means, a measurement probe mounted in said housing in proximity to said outlet for viewing the product in the extruder, a spectrometer connected to said probe for cooperating therewith to produce an output signal indicative of the coloration of said product, evaluation means connected to said spectrometer for evaluating said output signal in comparison to the output signal of a desired product of determined composition and coloration, said control means being connected to said evaluation means for operating said regulating means, when the output signal of the actual product in the extruder is different from the output signal of the desired product, in order to equalize said signals.

By use of a spectrometer and the connection thereof directly in the discharge region of the extruder, the actual effective content of the coloring substances in the extrudate is taken as the basis for the change in a predetermined composition.

This is achieved by bringing the measurement probe close to the mixing material within the extruder. By the arrangement of a glass stopper, which is directly connected to the measurement probe within a stepped borehole, neither the mixed material nor the mixing and kneading elements are affected. Furthermore, emergence of the mixing material in the region of the measurement point is effectively prevented.

DETAILED DESCRIPTION OF A PREFERRED EMBODIMENT

Figure 1:
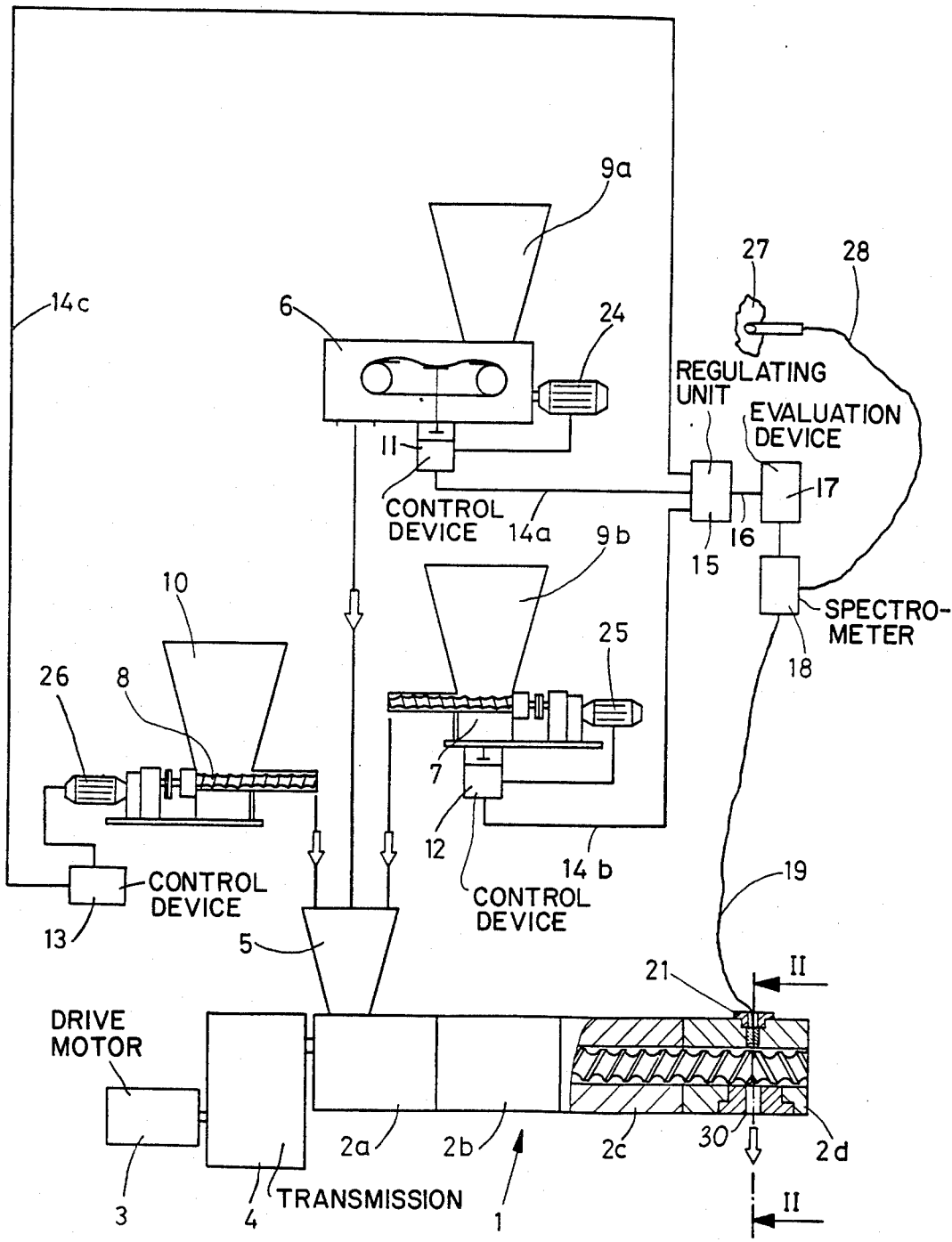
FIG. 1 is a diagrammatic elevational view, partly broken away and in section of one embodiment of the apparatus according to the invention.

In the drawing there is seen a screw extruder 1 having two extrusion shafts driven by a drive motor 3 through the intermediary of a transmission 4. The arrangement of the extrusion shafts will be described in greater detail later. The extruder 1 has a housing for the shafts which is composed of successive housing segments 2a, 2b, 2c and 2d.

The components of the mixture to be fed to the extruder 1, comprises solid plastic particles as a base component, color concentrates, fillers and pigments in powder form. The components are fed either individually or premixed to a supply hopper 5. In the illustrated embodiment, the components are fed to the hopper 5 individually from respective proportioning or dosaging devices such as, for instance, a dosaging belt scale 6, a differential scale 7 and a dosaging worm 8.

Both the dosaging scales 6 and 7 as well as the dosaging worm 8 have respective supply hoppers 9a, 9b and 10 in which the individual components are stored.

The dosaging scales 6 and 7 have respective control devices 11 and 12 for controlling corresponding drive motors 24 and 25 whereas a control device 13 containing a thyristor unit controls a drive motor 26 of the dosaging worm 8. The control devices 11, 12, 13 are connected by respective lines 14a, 14b, and 14c to a programmable control and regulating unit 15 which controls the rate of delivery of the dosaging devices in accordance with a programmed composition for the mixture. The control and regulating unit 15 is connected by a line 16 to an evaluation device 17 and a spectrometer 18.

Figure 2:
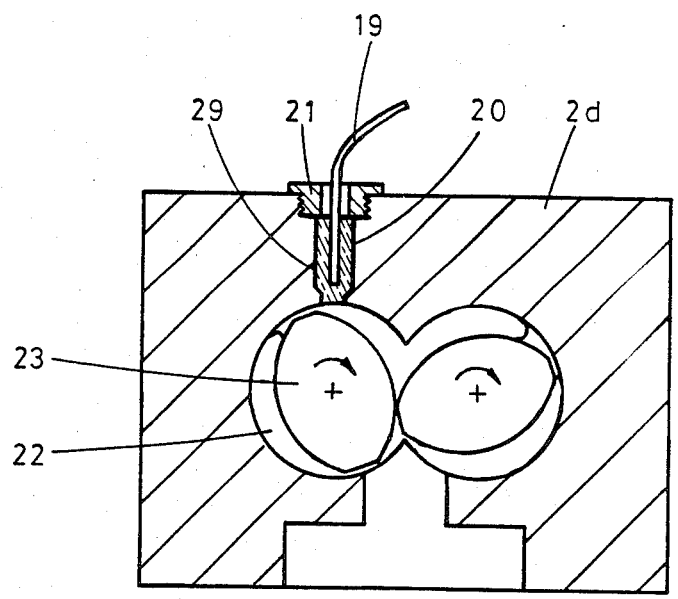
FIG. 2 is a sectional view taken on line II—II in FIG. 1.

A light-transmitting measurement probe 19 extends into a radial bore 20 provided in segment 2d of the housing such that the probe faces into the extrusion chamber 22 in the extruder. Thereby, the probe 19 can view the mixed material in the extruder. The bore 20 is located in proximity to the discharge outlet 30 at which the fully mixed material is discharged. As evident in FIG. 2, the extruder utilizes two shafts 23 with processing worms thereon. However, the invention is applicable to extruders with a single shaft or more than two shafts. In order to secure the probe 19 in position in bore 20, the bore 20 is formed with a step and a glass stopper 29 is fitted on the probe and secured within the stepped bore. A sleeve 21 is threadably engaged in the bore to secure the glass stopper therein. The glass stopper can be formed from two longitudinal segments for receiving and holding the probe along the longitudinal axis of the stopper. The measurement probe 19, in combination with the spectrometer 18, periodically transmits a light signal to evaluation device 17 based on the mixture of the material present in the cylinder 22.

The light signal which is obtained at the output of the spectrometer 18 and which is fed to the evaluation device 17 is a measure of the actual color intensity of the mixture to be extruded and serves as a comparative measurement of the desired color intensity stored in the evaluation device 17. A comparison takes place in the evaluation device 17 by comparison of the reflection values of a standard mixture with the ascertained reflection values of the melt in the extruder in order to obtain a control signal. The reflection values of the standard mixture are determined from a sample 27 and sent to the evaluation device by a test measurement probe 28. The output of this comparison is fed to control and regulating unit 15 which, in the event of a deviation from the standard mixture, corrects the drive of the dosaging devices for the additives and the pigments by modification of the originally programmed composition.

The following example is intended to make clear the method of the invention for the controlled addition of the color concentrate. The term "color concentrate" is intended to include dyestuff components or pure pigments.

For the preparation of a violet epoxy, polyester powder, enamel mixture, the following composition of mixture components is entered in the control and regulating unit 15:

Polyester 40%, Epikote 24%, chalk 30.6%, red pigment 0.02%, blue pigment 0.01%, additive 5%, leveling agent 0.3%.

A sample of this composition is supplied as a desired, final mixture and is examined by test measurement probe 28 which is connected to the spectrometer 18 and matched to the measurement probe 19. The reflection values obtained thereby are stored in the evaluation device 17 as a desired value. After activating the dosaging devices 6, 7 and 8 and extruder 1 and after receiving a first final mixture at measurement probe 19, the actual reflection values of the mixture are measured by measurement probe 19 and spectrometer 18 and compared in the evaluation device 17 with the sample values. When a difference is found, this difference is sent to the control and regulating unit 15 by which the rate of feed is changed by correction of the speed of conveyance of the dosaging devices for the color concentrates and/or pigments.

At brief intervals, further measurements of the reflection values are automatically made and are evaluated in the same manner so as to permit subsequent further corrections of the composition until the extruded product has attained the reflection values of the sample.

Although the invention has been described in relation to a specific embodiment thereof, it will become apparent to those skilled in the art that numerous modifications and variations can be made within with scope and spirit of the invention as defined by the attached claims.

What is claimed is:

1. A method of regulating the drive of a plurality of dosaging devices for the controlled feeding of color concentrates and additives into a supply hopper of a screw extruder for producing a mixed product of determined composition and coloration, said method comprising:

periodically measuring the coloration of the mixed product at an outlet of the extruder by a spectrometer connected to a measurement probe, comparing a light signal representing the measured coloration of the mixed product with a light signal representing the coloration of the desired product of determined composition, and adjusting the supply of the concentrates and additives, as necessary to the mixed product in the extruder while constantly maintaining the flow rate of the mixed product so that the measured coloration of the product at the outlet of the extruder is the same as the coloration of the desired product and thereby the composition of the product will be in correspondence with the desired composition.

2. A method as claimed in claim 1 wherein the coloration of the desired product of determined composition is measured by a second measurement probe connected to the spectrometer.

3. A method as claimed in claim 2 wherein the second measurement probe faces a sample of the desired product of determined composition.

4. Apparatus for producing an extruded plastic product of determined composition and coloration comprising a screw extruder including a housing having an inlet and an outlet, drive means for driving the screw extruder at a substantially constant velocity, a hopper at said inlet, first means for introducing solid, plastic particles into said hopper, second means for introducing color concentrates into said hopper and third means for introducing additives into said hopper, control means connected to each of said first, second and third means for regulating the output therefrom into the hopper, regulating means connected to said control means for operating said control means, a measurement probe mounted in said housing in proximity to said outlet for viewing the product in the extruder, a spectrometer connected to said probe for cooperating therewith to produce an output light signal indicative of the coloration of said product, evaluation means connected to said spectrometer for evaluating said output light signal in comparison with the output light signal of a desired product of determined composition and coloration, said regulating means being connected to said evaluation means for operating said control means, when the output light signal of the actual product in the extruder is different from the output light signal of the desired product in order to equalize said light signals.

5. Apparatus as claimed in claim 4 wherein said housing has an extrusion chamber in which the components of the composition are mixed, said housing having a bore which opens into said chamber and in which said measurement probe is disposed and a glass stopper receiving said probe and secured in said bore.

6. Apparatus as claimed in claim 5 wherein said bore has a step and said stopper has a corresponding step, and a sleeve in said bore securing said stopper therein.

7. Apparatus as claimed in claim 6 wherein said measurement probe extends through said sleeve outside said housing to said spectrometer and in cooperation with said glass stopper provides light-transmitting connection between the spectrometer and the material in the chamber of the extruder.

* * * * *